(12) United States Patent
Aubin et al.

(10) Patent No.: US 8,152,456 B2
(45) Date of Patent: Apr. 10, 2012

(54) TURBOJET COMPRESSOR

(75) Inventors: Stephan Aubin, Maisons Alfort (FR);
Olivier Belmonte, Perthes en Gatinais (FR)

(73) Assignee: SNECMA, Paris (FR)

( * ) Notice: Subject to any disclaimer, the term of this patent is extended or adjusted under 35 U.S.C. 154(b) by 574 days.

(21) Appl. No.: 12/358,675

(22) Filed: Jan. 23, 2009

(65) Prior Publication Data
US 2009/0191049 A1 Jul. 30, 2009

(30) Foreign Application Priority Data

Jan. 30, 2008 (FR) ...................... 08 50565

(51) Int. Cl.
*F01D 11/08* (2006.01)
(52) U.S. Cl. .................................. 415/173.1
(58) Field of Classification Search ............... 415/173.1, 415/211.2, 110, 1, 191, 227, 181; 416/193 A, 416/97 R, 223 R, 238
See application file for complete search history.

(56) References Cited

U.S. PATENT DOCUMENTS

| 3,481,531 A | 12/1969 | MacArthur |
| 5,642,985 A * | 7/1997 | Spear et al. .................. 416/238 |
| 6,561,761 B1 * | 5/2003 | Decker et al. ............. 415/173.1 |
| 7,249,933 B2 * | 7/2007 | Lee et al. ................... 416/97 R |

FOREIGN PATENT DOCUMENTS

| CH | 229266 | 10/1943 |
| EP | 1 087 100 A2 | 3/2001 |
| EP | 1 126 132 A2 | 8/2001 |

* cited by examiner

*Primary Examiner* — Alexander Gilman
(74) *Attorney, Agent, or Firm* — Oblon, Spivak, McClelland, Maier & Neustadt, L.L.P.

(57) ABSTRACT

The invention relates to a turbojet compressor comprising a shroud and a plurality of blades, each fixed via its root to the shroud. Level with each blade root, the shroud presents a suction-side ramp and a pressure-side ramp extending from the trailing edge of the blade to beyond its leading edge. The pressure-side and suction-side ramps join together upstream from the leading edge of the blade to form a projection presenting a profile that is twisted about the axis of the shroud so as to force the gas stream flowing in each flow passage to go round the blade root essentially on the suction-side thereof, and the suction-side ramp presents a profile that is inclined relative to the outside surface of the shroud so as to deflect the gas stream flowing in the corresponding flow passage from the suction-side surface of the blade towards the pressure-side surface of the adjacent blade.

13 Claims, 3 Drawing Sheets

TURBOJET COMPRESSOR

FIELD OF THE INVENTION

The present invention relates to the general field of turbojet compressors. More precisely, it relates to the fan (or low-pressure compressor) of a turbojet of the bypass type.

In a bypass turbojet, air is compressed successively in a low-pressure compressor and in a high-pressure compressor, and it is then mixed with fuel and burnt in a combustion chamber. The energy extracted from the combustion gas is transformed into mechanical energy in a high-pressure turbine that serves to drive the high-pressure compressor, and by a low-pressure turbine that serves to drive the low-pressure compressor.

In such a turbojet, the low-pressure compressor, also known as a fan, generally has a single stage of blades, each fixed via its root to a shroud that is itself movable in rotation about a longitudinal axis of the turbojet. An annular casing disposed concentrically around the shroud co-operates therewith to define an annular duct for passing the flow of air that passes through the fan.

The high-pressure compressor is generally made up of a plurality of stages, each stage being formed by a grid of stator vanes situated beyond a gird of rotor blades.

A current trend with engine manufacturers consists in seeking to reduce the number of low-pressure compressor stages so as to reduce the size and the weight thereof. For this purpose, in order to avoid penalizing the performance of the turbojet in terms of air compression, it is necessary to increase the compression and pumping efficiency of the fan.

One known solution for increasing the compression and pumping efficiency of the fan consists in increasing the radius of the flow duct for air passing through the fan. By way of example, for this purpose document U.S. Pat. No. 6,561,761 describes the principle of "deepening" the duct in the shroud by forming "flutes" between the blade roots. The presence of these flutes enables the blade roots to compress air more easily and with smaller aerodynamic losses.

Such a modification of the air flow duct enables the Mach number at the inlet of the fan to be reduced and enables air to be better compressed at the outlet, by increasing the radius effect. Nevertheless, the fact that the duct is deepened in the shroud can have harmful consequences on the aerodynamic behavior of the blade root sections, in particular in the recompression zone situated on the suction-sides of the blades.

OBJECT AND SUMMARY OF THE INVENTION

A main object of the present invention is thus to mitigate such drawbacks by proposing a fan shroud shape that makes it possible to further increase the compression and pumping efficiency of the low-pressure compressor of a turbojet.

This object is achieved by a turbojet compressor comprising: a shroud rotatable about a longitudinal axis of the compressor; and a plurality of blades, each fastened via a root to the shroud and circumferentially spaced apart from one another so as to define between them flow passages for a gas stream passing through the compressor; each blade having a pressure-side surface and a suction-side surface circumferentially opposite from its pressure-side surface, the pressure-side and suction-side surfaces extending axially between a leading edge and a trailing edge of the blade; wherein the shroud presents, level with each blade root:

a suction-side ramp adjoining the suction-side surface of the blade and extending axially from the trailing edge of the blade to beyond its leading edge;

a pressure-side ramp adjoining the pressure-side surface of the blade and extending axially from the trailing edge of the blade to beyond its leading edge;

the pressure-side and suction-side ramps joining together upstream from the leading edge of the blade to form a projection, said projection presenting a profile that is twisted about the axis of the shroud so as to force the gas stream flowing in each flow passage to go round the blade root essentially via the suction-side thereof; and the suction-side ramp presenting, between the leading edge and the trailing edge of the blade, a profile that is inclined relative to the outside surface of the shroud so as to deflect the gas stream flowing in the corresponding flow passage from the suction-side surface of the blade towards the pressure-side surface of the adjacent blade.

Because of the presence of the projection upstream from each blade root, the gas stream entering the compressor is forced to go round the blade root by passing mainly via the suction-side thereof (as opposed to via its pressure-side). The gas stream is then accelerated by suction and subsequently deflected towards the pressure-side surface of the adjacent blade because of the presence of the suction-side ramp. The compression and pumping efficiency of the compressor is thereby improved.

In an advantageous disposition, the inclination of the profile of each suction-side ramp decreases progressively from the leading edge to the trailing edge of each corresponding blade.

In another advantageous disposition, each suction-side ramp extends circumferentially over a distance that increases progressively from the leading edge to the trailing edge of the corresponding blade.

In yet another advantageous disposition, the profile of the projection associated with a blade is twisted about the longitudinal axis of the compressor in the direction of rotation of the shroud.

In yet another advantageous disposition, the upstream end of the projection associated with a blade is substantially in axial alignment with the leading edge of an adjacent blade.

Each pressure-side ramp may present, between the leading edge and the trailing edge of the corresponding blade, a profile that is inclined relative to the outside surface of the shroud. Under such circumstances, the inclination of the profile of each pressure-side ramp may increase progressively from the leading edge to the trailing edge of the corresponding blade, and each pressure-side ramp may extend circumferentially over a distance that decreases progressively from the leading edge to the trailing edge of the corresponding blade.

The invention also provides a turbojet including a compressor as defined above.

BRIEF DESCRIPTION OF THE DRAWINGS

Other characteristics and advantages of the present invention appear from the following description with reference to the accompanying drawings that show an embodiment having no limiting character. In the figures.

DETAILED DESCRIPTION OF AN EMBODIMENT

Figure 1:
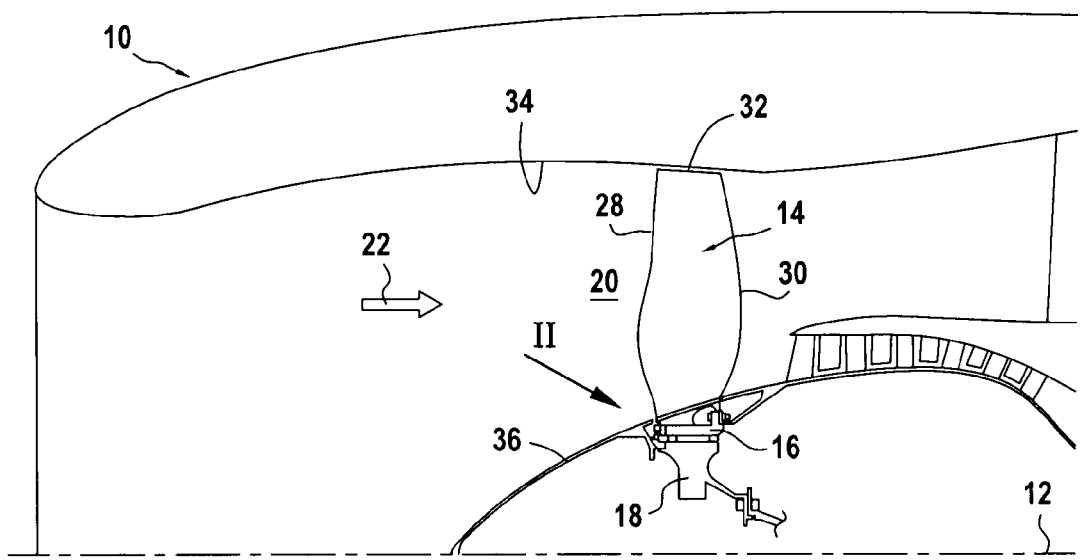
FIG. 1 is a fragmentary view in longitudinal section of a fan in a first embodiment of the invention.

FIG. 1 shows a portion of a fan 10 (or low-pressure compressor) of a turbojet that is axially symmetrical about its longitudinal axis 12.

The fan 10 is situated at the inlet of the turbojet. It comprises a plurality of blades 14, each fastened in well-known manner via its root 16 to a disk 18 mounted to rotate about the longitudinal axis 12.

Figure 2:
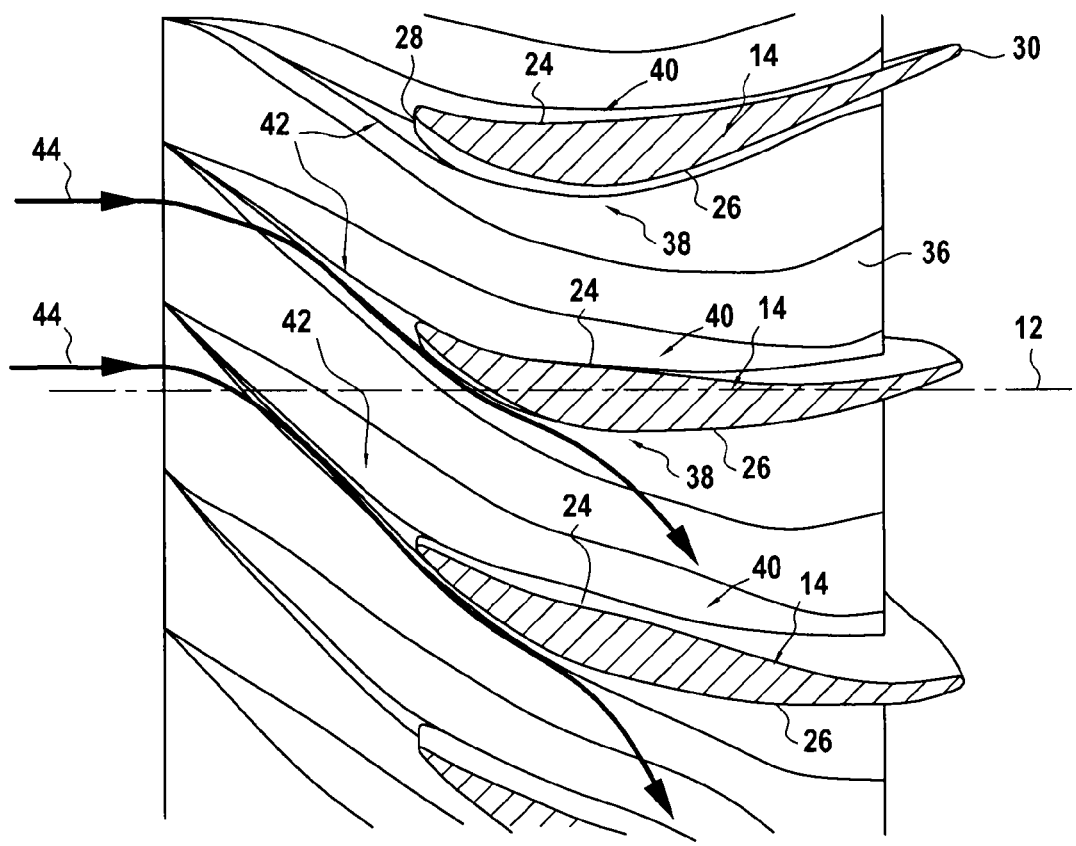
FIG. 2 is a view on II of FIG. 1.
Figure 3:
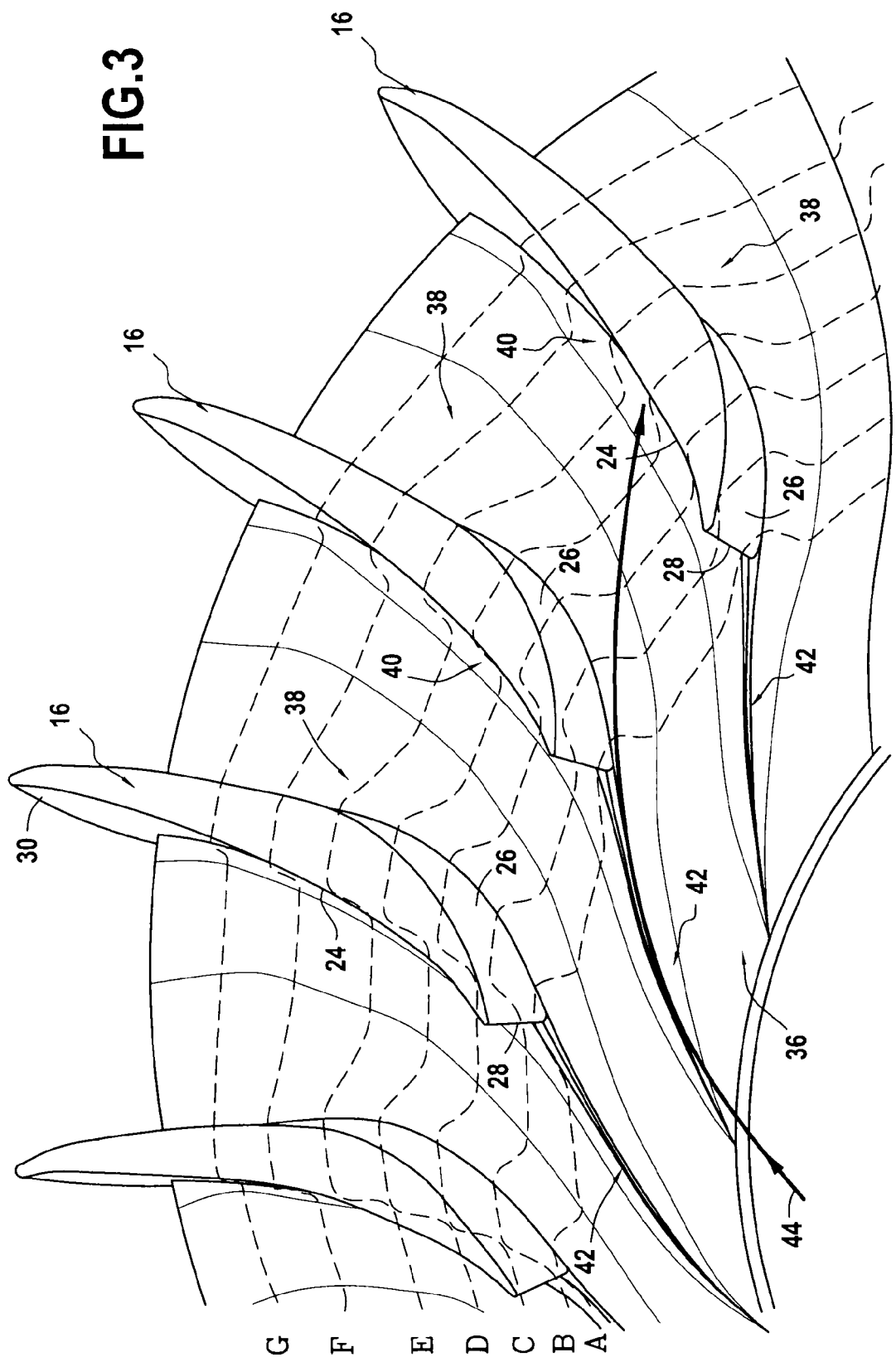
FIG. 3 is a profile view of the roots of adjacent fan blades of FIG. 1.

As shown in FIGS. 2 and 3, the fan blades 14 are regularly spaced apart from one another in a circumferential direction so as to define between them portions of an annular passage (or duct) 20 through which there flows a stream of air 22 passing through the fan 10.

In known manner, rotation of the disk 18 and of the fan blades 14 delivers energy to the air passing via the passage 20 of the fan and increases its pressure, while decreasing its relative flow speed.

Each blade 14 has a pressure-side surface 24 and a suction-side surface 26 that is circumferentially opposite its pressure-side surface (FIG. 2). The pressure-side and suction-side surfaces extend firstly axially between a leading edge 28 and a trailing edge 30 of the blade, and secondly radially between the corresponding roots 16 and tips 32.

Furthermore, each blade 14 presents a profile that is twisted between its root 16 and its tip 32, which profile is optimized to obtain best air pumping and compression efficiency.

The flow passage 20 for the stream of air through the fan is defined radially, firstly on the outside by the inside surface of an annular casing 34 centered on the longitudinal axis 12 and surrounding the blades 14, and secondly on the inside by the outside surface of a shroud 36 secured to the disk 18 and centered on the longitudinal axis 12.

The shroud 36 may be constituted by a plurality of platforms, each secured to a blade root 16, and serving, when placed side by side circumferentially, to define a substantially continuous annular surface.

According to the invention, at each blade root 16, the shroud 36 presents a suction-side ramp 38 adjoining to the suction-side 26 of the corresponding blade and a pressure-side ramp 40 adjoining to the pressure-side surface 24 of the blade.

The pressure-side and suction-side ramps may be obtained by deforming the shroud 36. Each extends axially (i.e. along the longitudinal axis 12) from downstream to upstream going from the trailing edge 30 of the blade to beyond its leading edge 28.

Furthermore, for each blade 14, the pressure-side and suction-side ramps 38 and 40 join upstream from the leading edge 28 of the blade so as to form a projection 42 that projects radially into the flow passage 20.

The projection 42 as defined in this way presents a profile that is twisted about the axis 12, with all of the projections of the shroud 36 being twisted in the same direction (which preferably corresponds to the direction of rotation of the shroud about the axis 12).

The twisting of the profile of each projection 42 is implemented in such a manner as to force the stream of air entering the flow passage 20 level with the blade root to go round each blade root essentially via the suction-side thereof (instead of via its pressure-side).

Furthermore, each suction-side ramp 38 presents, between the leading edge 28 and the trailing edge 30 of the corresponding blade, a profile that is inclined relative to the outside surface of the shroud 36. This inclination ($\alpha_A$ to $\alpha_G$) can be seen in particular in FIG. 4.

The inclination of the suction-side ramp enables the stream of air flowing along the flow passage that is defined circumferentially between the suction-side surface 26 of the corresponding blade and the pressure-side surface 24 of the adjacent blade, and more precisely along the suction-side of the blade to be deflected towards the pressure-side surface of the adjacent blade.

Level with each blade root 16, the movement of the air entering the flow passage 20 is represented by arrows 44 shown in FIGS. 2 and 3. The air penetrates into the flow passage in a direction that is substantially axial. In the gap situated between the upstream end of the shroud 36 and the leading edges 28 of the blades, the air flowing against the outside surface of the shroud is forced to go round each blade root by passing mainly via the suction-side surface thereof. Downstream from the leading edge 28 of each blade, the inclination of the suction-side ramp 38 serves to accelerate the air stream by suction and to deflect it towards the pressure-side surface of the adjacent blade.

According to an advantageous characteristic of the invention, the inclination of the profile of each suction-side ramp 38 decreases progressively from the leading edge 28 to the trailing edge 30 of the corresponding blade.

Figure 4:
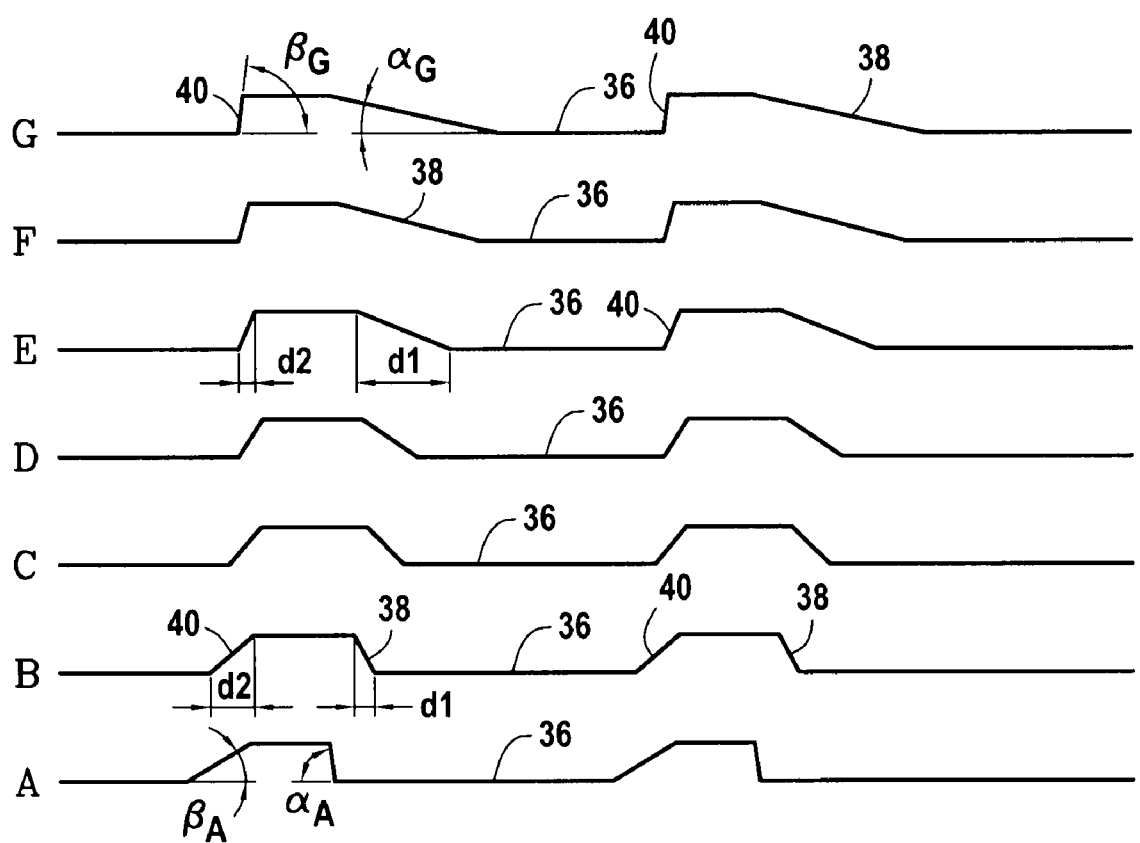
FIG. 4 is a fragmentary developed view of the profile of the shroud on cross-section lines A to G in FIG. 3.

In FIG. 4, the inclination of the profile of the suction-side ramps relative to the outside surface of the shroud thus passes from an angle $\alpha_A$ close to 90° (the line A corresponding to a cross-section level with the leading edges of the blades) to an angle $\alpha_G$ close to 0° (the line G corresponding to the cross-section that is furthest downstream).

According to another advantageous characteristic of the invention, each suction-side ramp 38 extends, in the circumferential direction, over a distance d1 that increases progressively from the leading edge 28 to the trailing edge 30 of the corresponding blade (this characteristic is also visible in FIG. 4).

These two characteristics thus serve to relieve recompression of the air after the air stream has been accelerated downstream from the leading edge 28 of each blade.

According to yet another advantageous characteristic of the invention, the upstream end of the projection 42 associated with a blade 14 is substantially in axial alignment (i.e. on the axis 12) with the leading edge 28 of an adjacent blade.

This characteristic can be seen more particularly in FIG. 2 and it serves to maximize "plugging" of the flow passage for air situated between the suction side of one blade and the pressure side of the adjacent blade, thereby forcing more air to go round the blade roots via their suction-sides.

It should also be observed that the thickness of the projection 42 decreases progressively from the leading edges 28 of the blades and disappears level with the upstream end of the shroud 36.

Various aspects of the pressure-side ramps 40 associated with the blades 14 are described below.

Like the suction-side ramps, each pressure-side ramp 40 presents, between the leading edge 28 and the trailing edge 30 of the corresponding blade, a profile that is inclined relative to the outside surface of the shroud 36 in such a manner as to increase the section of the passage.

Furthermore, unlike the suction-side ramps, the inclination of the profile of each pressure-side ramp 40 preferably increases progressively from the leading edge 28 to the trailing edge 30 of the corresponding blade. Thus, the inclination of the profile of the pressure-side ramp relative to the outside surface of the shroud goes from an angle $\beta_A$ close to 0° to an angle $\beta_G$ close to 90° (FIG. 4).

Still unlike the suction-side ramps, each pressure-side ramp 40 preferably extends in the circumferential direction over a distance d2 that decreases progressively going from the leading edge 28 to the trailing edge 30 of the corresponding blade. The purpose of this characteristic is to achieve greater compression on the pressure side of the blade.

What is claimed is:

1. A turbojet compressor comprising:
   a shroud rotatable about a longitudinal axis of the compressor; and
   a plurality of blades, each fastened via a root to the shroud and circumferentially spaced apart from one another so as to define between them flow passages for a gas stream passing through the compressor;
   each blade having a pressure-side surface and a suction-side surface circumferentially opposite from its pressure-side surface, the pressure-side and suction-side surfaces extending axially between a leading edge and a trailing edge of the blade;
   wherein the shroud presents, level with each blade root:
   a suction-side ramp adjoining the suction-side surface of the blade and extending axially from the trailing edge of the blade to beyond its leading edge;
   a pressure-side ramp adjoining the pressure-side surface of the blade and extending axially from the trailing edge of the blade to beyond its leading edge;
   the pressure-side and suction-side ramps joining together upstream from the leading edge of the blade to form a projection, said projection presenting a profile that is twisted about an axis of the shroud so as to force the gas stream flowing in each flow passage to go around the blade root essentially via the suction-side thereof;
   the suction-side ramp presenting, between the leading edge and the trailing edge of the blade, a profile that is inclined relative to the outside surface of the shroud so as to deflect the gas stream flowing in the corresponding flow passage from the suction-side surface of the blade towards the pressure-side surface of an adjacent blade; and
   the suction-side ramp extending circumferentially over a distance that increases progressively from the leading edge to the trailing edge of the corresponding blade.

2. A compressor according to claim 1, wherein the inclination of the profile of each suction-side ramp decreases progressively from the leading edge to the trailing edge of each corresponding blade.

3. A compressor according to claim 2, wherein the inclination of the profile of each suction-side ramp decreases progressively from an angle close to 90° near the leading edge to an angle close to 0° near the trailing edge of each corresponding blade.

4. A compressor according to claim 1, wherein the profile of the projection associated with a blade is twisted about the longitudinal axis of the compressor in the direction of rotation of the shroud.

5. A compressor according to claim 1, wherein the upstream end of the projection associated with a blade is substantially in axial alignment with the leading edge of an adjacent blade.

6. A compressor according to claim 1, wherein each pressure-side ramp presents, between the leading edge and the trailing edge of the corresponding blade, a profile that is inclined relative to the outside surface of the shroud.

7. A compressor according to claim 6, wherein the inclination of the profile of each pressure-side ramp increases progressively from the leading edge to the trailing edge of the corresponding blade.

8. A compressor according to claim 7, wherein the inclination of the profile of each pressure-side ramp increases progressively from an angle close to 0° near the leading edge to an angle close to 90° near the trailing edge of the corresponding blade.

9. A compressor according to claim 6, wherein each pressure-side ramp extends circumferentially over a distance that decreases progressively from the leading edge to the trailing edge of the corresponding blade.

10. A compressor according to claim 1, constituting a turbojet fan.

11. A turbojet, including a compressor according to claim 1.

12. A compressor according to claim 1, wherein the thickness of the projection decreases progressively from the leading edge of the blade and disappears level with an upstream end of the shroud.

13. A compressor according to claim 1, wherein the pressure-side and suction-side ramps raise above the level of the outside surface of the shroud.

* * * * *